United States Patent
Willim

(10) Patent No.: US 10,486,945 B2
(45) Date of Patent: Nov. 26, 2019

(54) CRANE HAVING AN APPARATUS FOR DETERMINING THE EFFECTIVE COUNTERWEIGHT OF SAID CRANE

(71) Applicant: Liebherr-Werk Ehingen GmbH, Ehingen (DE)

(72) Inventor: Hans-Dieter Willim, Ulm-Unterweiler (DE)

(73) Assignee: Liebherr-Werk Ehingen GmbH, Ehingen (DE)

( * ) Notice: Subject to any disclaimer, the term of this patent is extended or adjusted under 35 U.S.C. 154(b) by 184 days.

(21) Appl. No.: 15/839,094

(22) Filed: Dec. 12, 2017

(65) Prior Publication Data
US 2019/0002250 A1    Jan. 3, 2019

(30) Foreign Application Priority Data
Dec. 7, 2016 (DE) .................. 10 2016 014 571

(51) Int. Cl.
  *G01L 5/00* (2006.01)
  *B66C 13/16* (2006.01)
  *B66C 23/74* (2006.01)
  *B66C 23/88* (2006.01)
  *G01L 7/16* (2006.01)

(52) U.S. Cl.
  CPC ............. *B66C 13/16* (2013.01); *B66C 23/74* (2013.01); *B66C 23/88* (2013.01); *G01L 5/0061* (2013.01); *G01L 7/163* (2013.01)

(58) Field of Classification Search
None
See application file for complete search history.

(56) References Cited

U.S. PATENT DOCUMENTS

| | | | |
|---|---|---|---|
| 2011/0031202 A1* | 2/2011 | Pech | B66C 23/76 212/178 |
| 2011/0192815 A1* | 8/2011 | Kurotsu | B66C 23/76 212/196 |
| 2014/0330481 A1* | 11/2014 | Roeben | B66C 15/06 701/33.9 |
| 2015/0210515 A1* | 7/2015 | Pech | B66C 23/76 212/197 |
| 2016/0289047 A1* | 10/2016 | Albinger | B66C 13/16 |

FOREIGN PATENT DOCUMENTS

| | | | | |
|---|---|---|---|---|
| CN | 101021731 A | * | 8/2007 | |
| DE | 202014057777 U1 | | 4/2016 | |
| DE | 102016203607 A1 | * | 9/2017 | ............ B66C 23/88 |
| EP | 2799386 A1 | | 11/2014 | |
| JP | 0986878 A | | 3/1997 | |
| WO | 2012163190 A1 | | 12/2012 | |

* cited by examiner

*Primary Examiner* — Andre J Allen
(74) *Attorney, Agent, or Firm* — Dilworth & Barrese, LLP

(57) ABSTRACT

The invention relates to a crane having at least one apparatus for determining the effective counterweight of said crane comprising at least one receiver for receiving at least one counterweight body; at least one coupling that is configured to pivotably couple the receiver with the further structure of the crane; and at least one abutment that is configured to limit the pivot range of the receiver.

20 Claims, 3 Drawing Sheets

CRANE HAVING AN APPARATUS FOR DETERMINING THE EFFECTIVE COUNTERWEIGHT OF SAID CRANE

BACKGROUND OF THE INVENTION

The invention relates to a crane having at least one apparatus for determining the effective counterweight of said crane comprising at least one receiver for receiving at least one counterweight body; at least one coupling that is configured to pivotably couple the receiver with the further structure of the crane; and at least one abutment that is configured to limit the pivot range of the receiver.

In cranes known from the prior art, at least one counterweight provides a torque that counteracts the load borne by the crane. The applied counterweight in this respect substantially contributes to the stability of the crane.

The load torque restriction devices or load torque restriction apparatus or load torque restriction methods used in cranes make use of the amount of the effective counterweight or the effective mass and the corresponding effective lever arm in calculations on the stability of the crane. It is known in this context that the crane operator or another operator manually inputs the data required to carry out the load torque restriction.

It can happen in this process that unintended error inputs take place. This can happen, for example during the erection of a long boom of a crane. When carrying out crane work by means of an already equipped crane, the whole suspended ballast is not required, unlike in the procedure of setting up the crane, and it can happen that a sufficiently large ballast on the superstructure is sufficient for balancing. To increase the torque exerted on the crane by the ballast present, the crane operator can, for example, remove ballast plates from the superstructure of the crane and place them on the suspended ballast. After the erection of the crane, the suspended ballast can be removed and the crane can work only with the superstructure ballast. It is, however, important here to place the ballast plates previously restacked back onto the crane superstructure again. In accordance with another example, the crane control can have an erroneous counterweight stored that is too large. In this case, the boom could be luffed up too far, which could also result in a tilting backward of the crane.

SUMMARY OF THE INVENTION

Against this background, it is the object of the invention to provide an apparatus that can in particular independently determine the effective counterweight. An object of the invention can thus be seen in avoiding erroneous inputs on the setting of the load torque limitation or on the setting of the counterweight or to subject the manual input of a crane operator or of another operator to at least a countercheck or a plausibility check. A further object of the invention can be seen in providing a completely autonomously working device that makes inputs by the crane operator or by another operator superfluous.

This object is achieved in accordance with the invention by a crane having the features herein. Advantageous embodiments are also the subject herein. A crane is accordingly provided in which at least one force measurement device that is configured to determine the force introduced into an abutment by the receiver is provided in and/or at at least one abutment.

It can advantageously thus also be determined which counterweight is mounted on the crane without any intervention of a crane operator. On an additional manual input of the counterweight, a plausibility check can be made with the aid of the determined value and thus the reliability of a load torque limitation carried out on the basis of the counterweight can be improved.

It is conceivable in a preferred embodiment that the force measuring device comprises a cylinder and piston apparatus that is in particular hydraulic. The cylinder and piston apparatus can here be oriented in a tangential direction with respect to the pivot direction of the receiver. In the embodiment as a hydraulic cylinder and piston apparatus, at least some of the hydraulic system components already present at the crane can advantageously be used to perform the invention. The hydraulic cylinder and piston apparatus can here be arranged at the receiver or alternatively thereto at the remaining structure of the crane such that the receiver is supported at the remaining structure of the crane in at least one position via the cylinder and piston apparatus.

It is conceivable in a further preferred embodiment that at least one spring is provided that is configured to press the piston rod at least partly into the cylinder. The spring can thus serve to preload the cylinder space permanently at a specific system pressure of, for example, 30 bar. The pressure in the cylinder space can work against the spring. The preloading of the system can achieve the advantage that the system is always filled with sufficient oil. It cannot simply empty over the course of time and, for example due to leaks, and thus impair the functionality of the apparatus. The spring furthermore creates a compensation when a cold cylinder space and/or a cylinder space filled with cold oil heats up. The risk of overpressure in the cylinder space that can destroy the cylinder is thus avoided. A possible stroke path of the piston and/or spring excursion of the spring can amount to 20 mm, for example, here.

It is conceivable in a further preferred embodiment that the cylinder space of the cylinder is preloaded with a system pressure of 10-50 bar, in particular of 20-40 bar, and further particularly of 30 bar+/−5 bar.

Provision can furthermore be made that the backflow of a pressure medium from the cylinder can be blocked via a check valve. The check valve here provides that an increase of the hydraulic pressure can take place within the cylinder and piston apparatus that can be determined or measured by means of the force measurement device.

It is furthermore conceivable in a further preferred embodiment that the force measurement device is configured as a pressure meter for measuring the pressure within the cylinder. Provision can furthermore be made that a crane regulation/control is provided that is configured to calculate the effective counterweight from the measured pressure. For this purpose, the crane regulation/control can make use of different parameters such as the number of abutments, the geometrical relationships at the crane such as the occurring lever arms, distances and locations of the centers of gravity, and, for example, the spring constant of the spring.

Provision can furthermore be made in a further preferred embodiment that a safety device is provided that is configured to limit the maximum pressure in the measurement circuit to in particular 400 bar. It is hereby possible to avoid any possible damage to the measurement circuit or to prevent it.

Provision can be made in a further preferred embodiment that the piston rod is designed as spherical at its support surface. A canting or a blocking of the piston rod during the rotary movement of the receiver around the coupling designed as a pin, for example, is hereby prevented and the measurement accuracy of the apparatus is thereby improved.

The invention is furthermore directed to an apparatus for determining the effective counterweight at a crane, said apparatus comprising at least one abutment that is configured to limit the pivot range of a receiver for counterweights. The apparatus can further comprise further ones of the features named above with respect to the crane.

BRIEF DESCRIPTION OF THE DRAWINGS

Further details and advantages of the invention are explained with reference to the embodiment shown by way of example in the Figures. There are shown.

DESCRIPTION OF THE PREFERRED EMBODIMENTS

Figure 1:
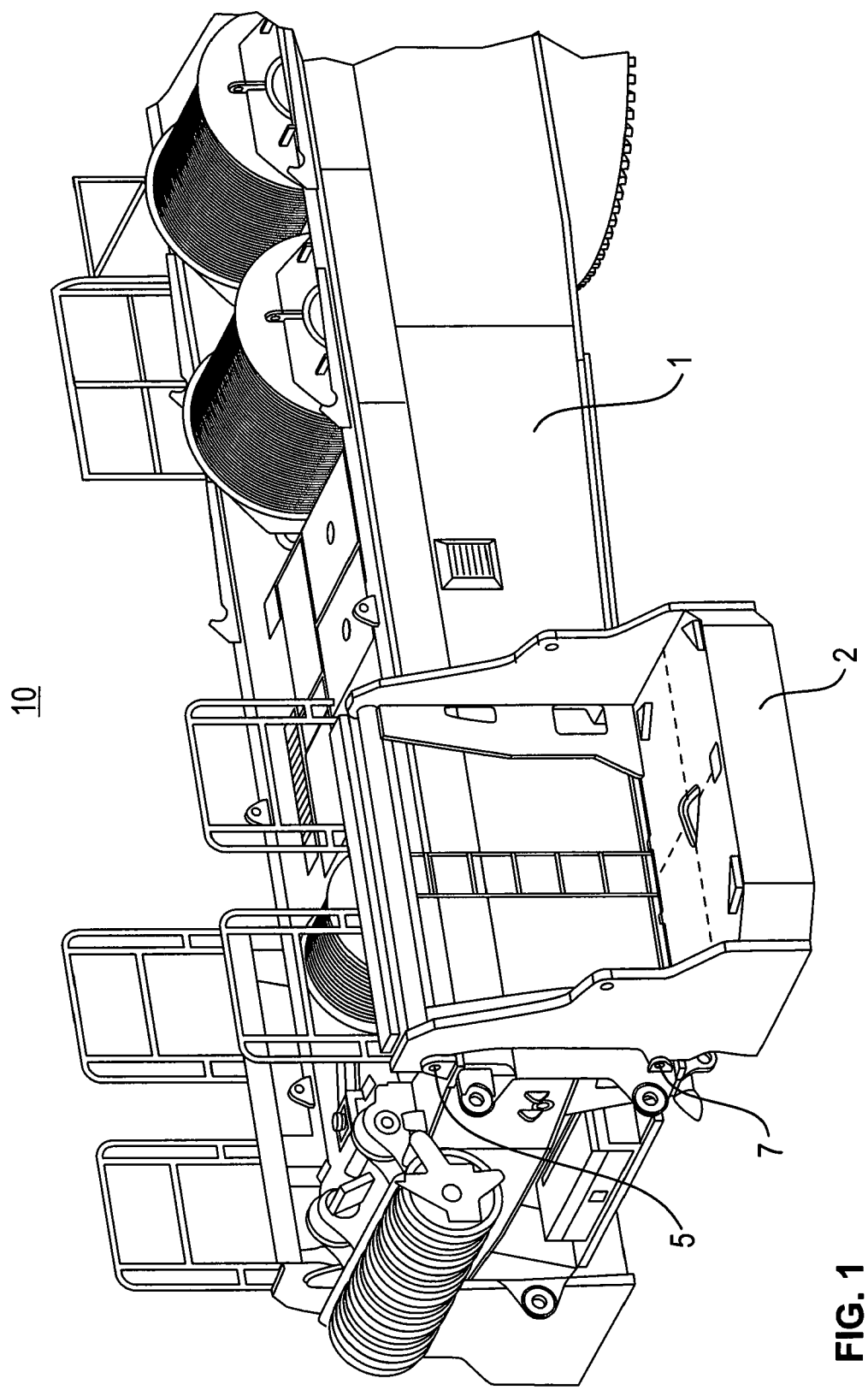
FIG. 1: a perspective partial view of the steel construction of the superstructure of a crane in accordance with the invention.

FIG. 1 shows a detail of a crane 10 in accordance with the invention having an apparatus for determining the effective counterweight that is provided at the crane 10. A receiver 2 is coupled to the remaining structure of the crane 10 here and is configured to receive one or more counterweight bodies 3 shown in FIG. 2a. The receiver 2 can here be called a ballast pallet 2 and can comprise at least one horizontal ground section on which the counterweight bodies 3 can be placed and at least one retaining section that is substantially arranged at right angles thereto and that holds the base section and the counterweight bodies 3 positionable thereon at the remaining structure of the crane 10.

A coupling 5 for a pivotable coupling of the receiver 2 with the further structure of the crane 10 can be provided in the upper region of the receiver 2. The coupling can comprise a pin 5 at the receiver 2 or at the crane 10 about which the receiver 2 is rotatably coupled to the crane 10.

At least one abutment 7 that is configured to limit the pivot range of the receiver 2 is provided in a region of the crane 10 or the receiver 2 in particular spaced apart from the pin 5. A force measurement device 6 can be provided in and/or at the abutment 7 and is configured to determine or to measure the force introduced into the abutment 7 by the receiver 2 or by the counterweight bodies 3 positioned on the receiver 2.

Ballast pallets 2 can be arranged both at the left and at the right at the superstructure 1 of the crane 10 shown in FIG. 1. The counterweight bodies 3 can be formed as counterweight plates 3 and/or can be stackable on the ballast pallets 2. It is possible here to use the crane 10 itself or an auxiliary crane to position the counterweight plates 3. A complex hydraulic apparatus for a craneless lifting of counterweight plates 3 can thus be omitted.

The force measurement device 6 can be configured as or can be composed of a hydraulic cylinder and piston apparatus. Alternative embodiments are also conceivable in which other force meters such as strain gauges are installed in the region of the abutment 7 and which can detect the forces or strains occurring therein.

Figure 2A:
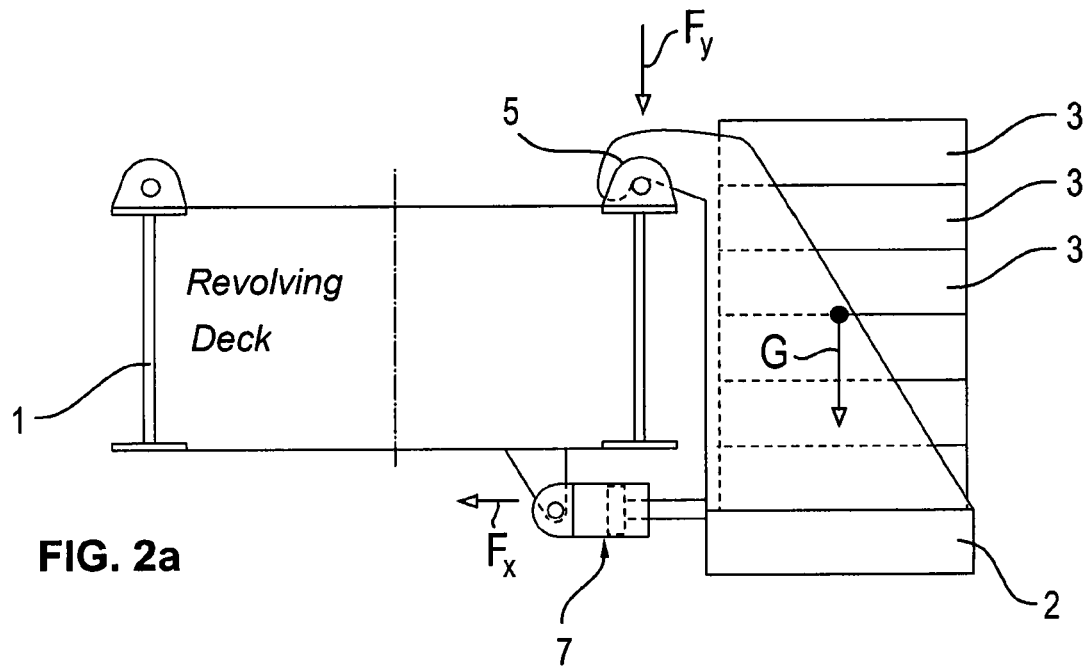
FIG. 2a: a schematic detailed view of a crane in accordance with the invention in a side view (only the right receiver is shown here)

FIG. 2a shows that the abutment 7 can be substantially positioned beneath the coupling 5 or the pin 5. The abutment 7 here only has to be positioned such that a torque resulting from the weight force of the counterweight bodies 3 can act on the abutment 7.

Figure 2B:
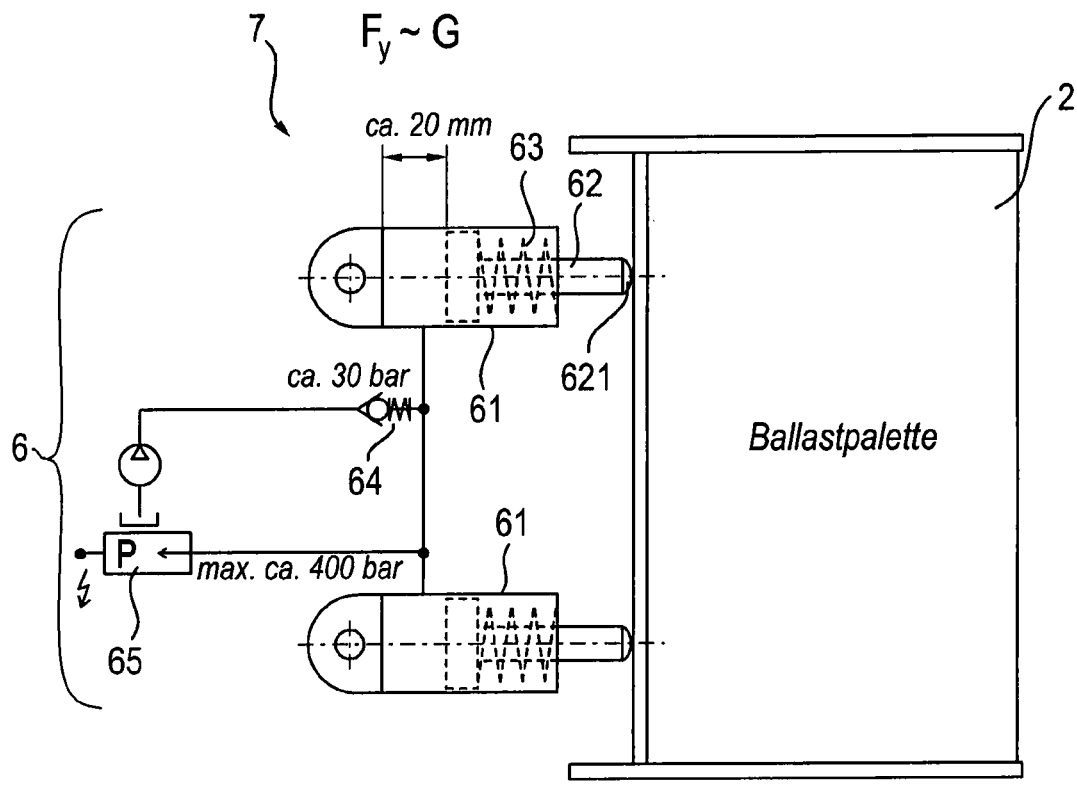
FIG. 2b: a schematic detailed view of a crane in accordance with the invention in a plan view.
Figure 3:
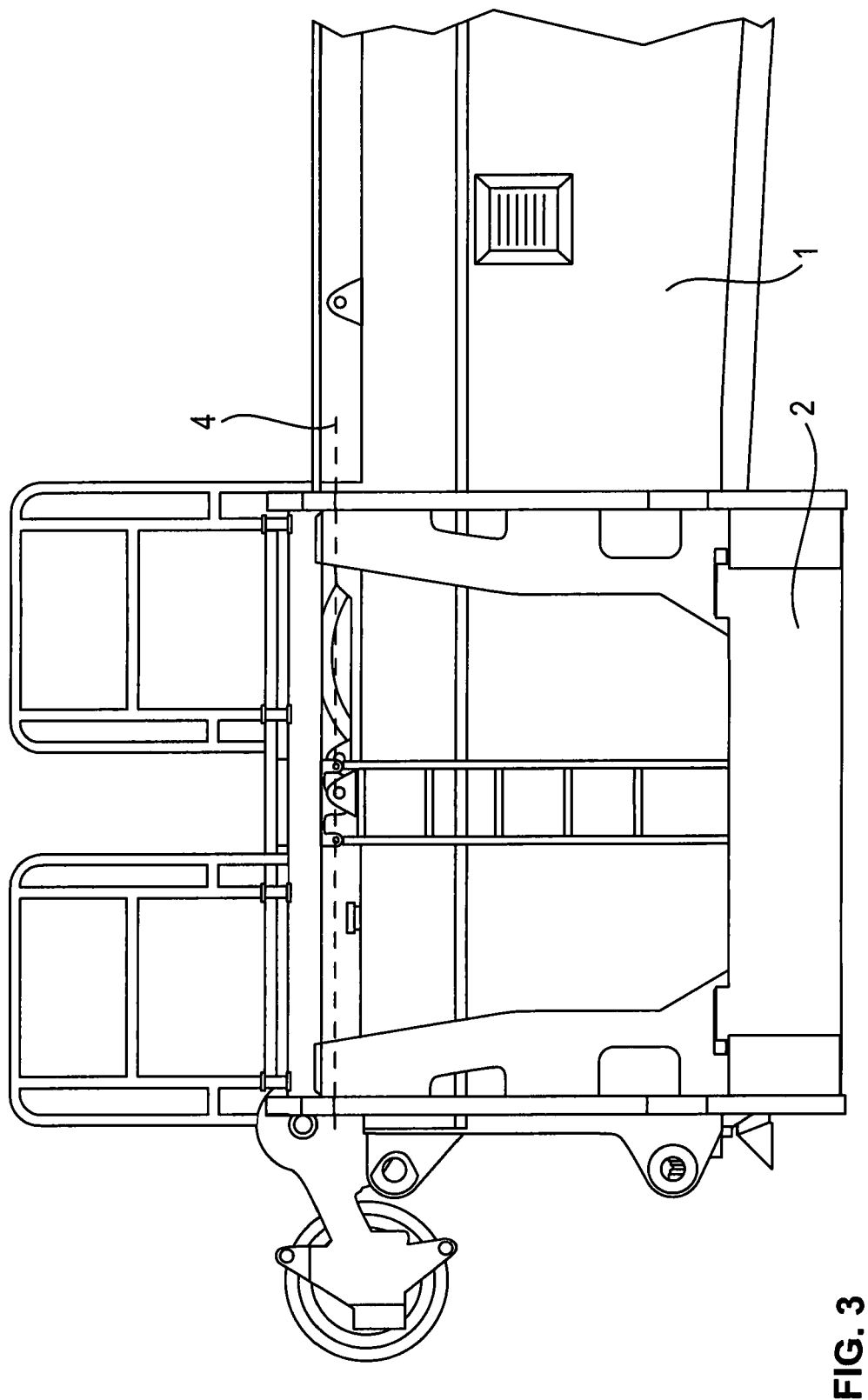
FIG. 3: a side view of a crane in accordance with the invention.

FIG. 2b shows that pressure sensors or fluid lines for the connection of pressure sensors can be provided at the piston sides of the cylinder and piston apparatus 61, 62. If, as shown, a plurality of cylinder and piston apparatus 61, 62 are provided, the total force acting thereon can be determined by a corresponding summing of the forces acting on the individual apparatus 61, 62.

FIG. 2b further shows that at least one spring 63 can be provided that is configured to press the piston rod 62 into the cylinder 61. The spring 63 can optionally serve to preload the cylinder space of the cylinder 61 at a specific system pressure. The spring 63 can here be arranged in the rod space of the respective cylinder and piston apparatus 61, 62.

A pressure meter 65 shown in FIG. 2b can comprise a safety device or can be coupled to a corresponding safety device that is configured to restrict the maximum pressure in the measurement circuit to, for example, 400 bar to protect the apparatus.

The components of the apparatus such as the abutment 7 or the coupling 5 can also be retroactively provided at or integrated in existing cranes, whereby a retrofitting of existing cranes with an apparatus in accordance with the invention is simply possible.

As can be seen from the Figures, the ballast pallets 2 can be connected to the superstructure 1 of the crane 10 such that they are pivotable about a horizontal pivot axis 4. An auxiliary crane can tie the ballast pallets 2 to its lifting hook and can suspend them at the pins or pin 5 that can form the pivot axis 4.

The ballast pallets 2 lie at the abutment 7 on a further letting down of the ballast pallets. The ballast pallets 2 can subsequently receive further counterweight plates 3. The force Fy in the pins 5 and the force Fx in the abutment 7 always increase here.

A force measurement device 6 that determines the force Fx can be provided in the abutment 7. The force Fx varies in dependence on the weight force G of the effective counterweight.

The force measurement device 6 can comprise cylinders 61 which a piston rod 62 exits. The piston rod 62 is pressed into the space of the cylinder 61 by a spring 63.

The cylinder space is permanently preloaded at a system pressure of e.g. 30 bar. The pressure in the cylinder space thus works against the spring 63. If the ballast pallet 2 now introduces the force Fx into the piston rod 62, the piston rod 62 wants to dip further into the cylinder space. A backflow of the hydraulic oil is, however, blocked by the check valve 64. The pressure increases. This increase can be determined in a pressure meter 65.

The crane receives the determined measurement values and determines the mass of the effect counterweight in dependence on different parameters and can provide it to the load torque restriction devices of the crane (as the equipped state).

The parameters can be:
Number of the abutments 7;
Geometrical relationships such as lever arms, spacing and locations of the centers of gravity, etc.;
Spring constant of the spring 63.

The limitation of the pressure in the measurement circuit to, for example, 400 bar can be set as a safety device. The piston rod 62 can furthermore be designed as spherical at its support surface 621.

The preloading of the system with the pressure of 30 bar provides the advantage that the system is always filled with sufficient oil. It cannot empty over the course of time and due to leaks and thus become non-functional. On the other hand, the spring 63 creates a compensation when a cold cylinder and a cylinder filled with cold oil heats up. The risk of overpressure in the cylinder space that can destroy the cylinder is thus avoided. Possible paths can here be a 20 mm stroke of the piston, for example.

The invention claimed is:

1. A crane (10) comprising at least one apparatus for determining the effective counterweight of the crane (10), having
    at least one receiver (2) configured for receiving at least one counterweight body (3);
    at least one coupling (5) configured to pivotably couple the receiver (2) with the further structure of the crane (10); and
    at least one abutment (7) configured to limit the pivot range of the receiver (2), wherein
    at least one force measurement device (6) is provided in and/or at the abutment (7) and is configured to determine the force introduced into the abutment (7) by the receiver (2).

2. A crane (10) in accordance with claim 1, wherein the force measurement device (6) comprises a piston and cylinder apparatus (61, 62), that is in particular hydraulic.

3. A crane (10) in accordance with claim 1, wherein at least one spring (63) is provided that is configured to press the piston rod (62) at least partly into the cylinder (61).

4. A crane (10) in accordance with claim 1, wherein the cylinder space of the cylinder (61) is preloaded at a system pressure of 10-50 bar, in particular of 20-40 bar, and further in particular of 30 bar+/−5 bar.

5. A crane (10) in accordance with claim 1, wherein the backflow of a pressure medium from the cylinder (61) is blockable via a check valve (64).

6. A crane (10) in accordance with claim 1, wherein the force measurement device (6) is configured as a pressure meter (65) for measuring the pressure within the cylinder (61).

7. A crane (10) in accordance with claim 6, wherein a crane regulation/control is provided that is configured to calculate the effective counterweight from the measured pressure.

8. A crane (10) in accordance with claim 1, wherein a safety device is provided that is configured to limit the maximum pressure in the measurement circuit to in particular 400 bar.

9. A crane (10) in accordance with claim 2, wherein the piston rod (62) is designed as spherical at its support surface.

10. An apparatus for determining the effective counterweight at a crane (10), wherein the apparatus comprises at least one abutment (7) that is configured to limit the pivot range of a receiver (2) for the counterweight.

11. A crane (10) in accordance with claim 2, wherein at least one spring (63) is provided that is configured to press the piston rod (62) at least partly into the cylinder (61).

12. A crane (10) in accordance with claim 11, wherein the cylinder space of the cylinder (61) is preloaded at a system pressure of 10-50 bar, in particular of 20-40 bar, and further in particular of 30 bar+/−5 bar.

13. A crane (10) in accordance with claim 3, wherein the cylinder space of the cylinder (61) is preloaded at a system pressure of 10-50 bar, in particular of 20-40 bar, and further in particular of 30 bar+/−5 bar.

14. A crane (10) in accordance with claim 2, wherein the cylinder space of the cylinder (61) is preloaded at a system pressure of 10-50 bar, in particular of 20-40 bar, and further in particular of 30 bar+/−5 bar.

15. A crane (10) in accordance with claim 14, wherein the backflow of a pressure medium from the cylinder (61) is blockable via a check valve (64).

16. A crane (10) in accordance with claim 13, wherein the backflow of a pressure medium from the cylinder (61) is blockable via a check valve (64).

17. A crane (10) in accordance with claim 12, wherein the backflow of a pressure medium from the cylinder (61) is blockable via a check valve (64).

18. A crane (10) in accordance with claim 11, wherein the backflow of a pressure medium from the cylinder (61) is blockable via a check valve (64).

19. A crane (10) in accordance with claim 4, wherein the backflow of a pressure medium from the cylinder (61) is blockable via a check valve (64).

20. A crane (10) in accordance with claim 3, wherein the backflow of a pressure medium from the cylinder (61) is blockable via a check valve (64).

* * * * *